P. H. PETERS.
PLANET GEARING.
APPLICATION FILED FEB. 11, 1910.

964,180.

Patented July 12, 1910.

Witnesses
B. Sommers
May Ellis

Inventor
Paul Heinrich Peters,
By Henry Orth Jr.
Att.

UNITED STATES PATENT OFFICE.

PAUL HEINRICH PETERS, OF HAMBURG, GERMANY.

PLANET-GEARING.

964,180.  Specification of Letters Patent. Patented July 12, 1910.

Application filed February 11, 1910. Serial No. 543,388.

*To all whom it may concern:*

Be it known that I, PAUL HEINRICH PETERS, a subject of the German Emperor, and resident of Hamburg, Germany, have invented certain new and useful Improvements in and Relating to Planet-Gearing, of which the following is a specification.

This invention relates to improvements in planet gears which are used as countershafts and serve to transmit the work of an engine or shaft running at a high speed very much geared down to a driven shaft in transmission gears of the kind used for electric motors, benzin motors, steam turbines, motor vehicles and the like. As compared with known gears of this kind the present invention presents the advantage that the power is transmitted only by means of gear wheels and that a very large number of teeth are always in mutual engagement so that very silent and uniform running is obtained and the crank slots, cam grooves and the like means which would otherwise be necessary and which occasion great friction, are dispensed with.

Figure 1:
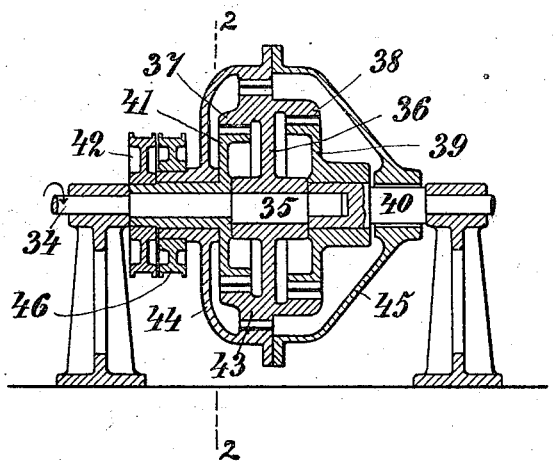
Figure 2:
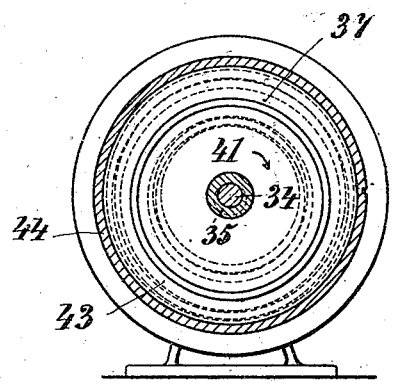

In the accompanying drawing Figure 1 is a longitudinal vertical section of a planet gearing embodying my invention, and Fig. 2 is a section on line 2—2 of Fig. 1.

In the construction illustrated the shaft to be driven may be rotated in either direction. The wheel member 36 is freely mounted on the middle eccentric part 35 of the driving shaft 34 and comprises two internally toothed wheel rims 37, 38 coaxial with each other and of different sizes. A gear wheel 39 fixed to the shaft 40 meshes with the toothed ring 38, and by means of a bore the shaft 40 concentrically embraces the spindle of the shaft 34. A counter gear wheel 41 meshes in the other wheel rim 37 of the wheel member 36, the long hub of this wheel 41 being loosely mounted on the driving shaft 34 and carrying a brake pulley 42. In addition to internal teeth 37, 38 the wheel member 36 is likewise provided with an external ring of teeth 43 which serves as a counter-wheel to internal teeth on the part 44 of the casing. The hub of the latter is loosely mounted on the hub of the wheel 41 and the other part 45 of the casing, which is screwed to the part 44, is freely mounted by its hub on the shaft 40. The hub of the casing member likewise carries a brake pulley 46 arranged beside the brake pulley 42.

Now assuming that the brake pulley 42 is held and the shaft 34 rotated in the direction indicated by the arrow. The ring of internal teeth 37 of the wheel member 36 freely mounted on the eccentric stud 35 then rolls upon the wheel 41 held by the braking and the movement of the wheel 36 which is thereby retarded is transmitted through its ring of teeth 38 on to the ring of teeth 39, the hub of which is keyed to the shaft 40; the casing 45, 44 and the brake pulley 46 which are likewise fixed to this shaft, participate in the rotation which is in the opposite direction to that of the driving shaft. If, on the other hand, the pulley 46 is locked by braking the rotation of the shaft 34 in the direction indicated by the arrow causes the teeth 43 to roll upon the internal teeth of the casing member 44 which is now held and the movement of the wheel member 36 is transmitted as before through the teeth 38 on to the teeth 39 and on to the shaft 40 but in the same direction of rotation as 34.

I claim:

1. A planet gearing comprising a driving shaft having an eccentric thereon, a main wheel rotatable on the eccentric having two internally toothed rims and an externally toothed rim, a counter wheel loose on the shaft having an externally toothed rim, a driven shaft, a gear wheel fixed on the latter, a casing rotatably mounted on the hub of the counter wheel and on the driven shaft and having internal teeth engaging the external teeth of the main wheel, braking means on the hub of the counter wheel and a braking means on the hub of the casing, for the purpose specified.

2. A planet gearing comprising a driven shaft having an eccentric thereon, a driven shaft having a bore which concentrically embraces the driving shaft, a main wheel rotatably mounted on said eccentric having two coaxial internally toothed rims of different size and an externally toothed rim, a counter wheel loose on the driving shaft having an externally toothed rim meshing with one of the internally toothed rims of the main wheel, a gear wheel fixed on the driven shaft having an externally toothed rim in mesh with the other internally toothed rim of the main wheel, a casing rotatably mounted on the hub of the counter wheel and on the driven shaft and having internal teeth meshing with the external teeth of the main wheel, a brake pulley fixed on the hub of the counter wheel and a brake pulley fixed on the hub of the casing, for the purpose specified.

PAUL HEINRICH PETERS.

Witnesses:
MAHMOUD LABEEB,
MAURICE MILLS.